No. 685,474. Patented Oct. 29, 1901.
B. B. HILL.
METHOD OF FORMING ENDLESS BANDS.
(Application filed May 1, 1901.)
(No Model.) 2 Sheets—Sheet 1.
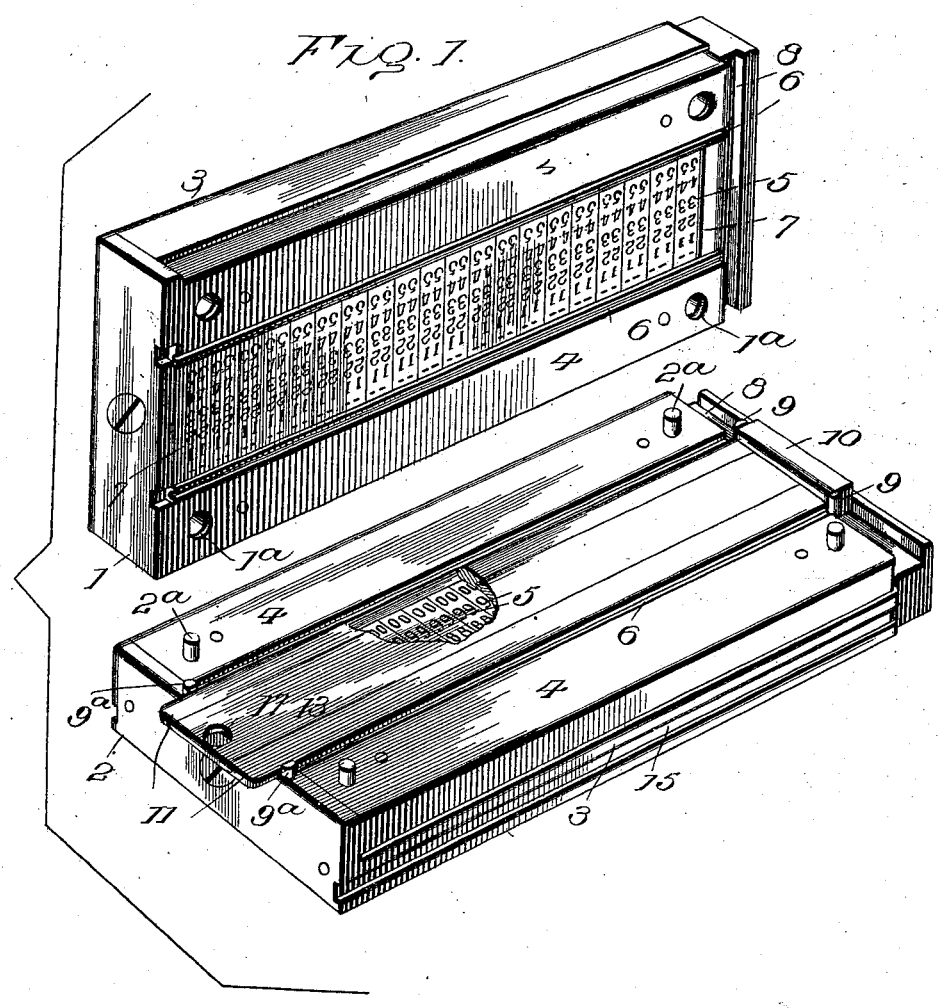
Inventor
Benjamin B. Hill
By Thos. E. Robertson
Attorney
Witnesses No. 685,474. Patented Oct. 29, 1901.
B. B. HILL.
METHOD OF FORMING ENDLESS BANDS.
(Application filed May 1, 1901.)
(No Model.) 2 Sheets—Sheet 2.
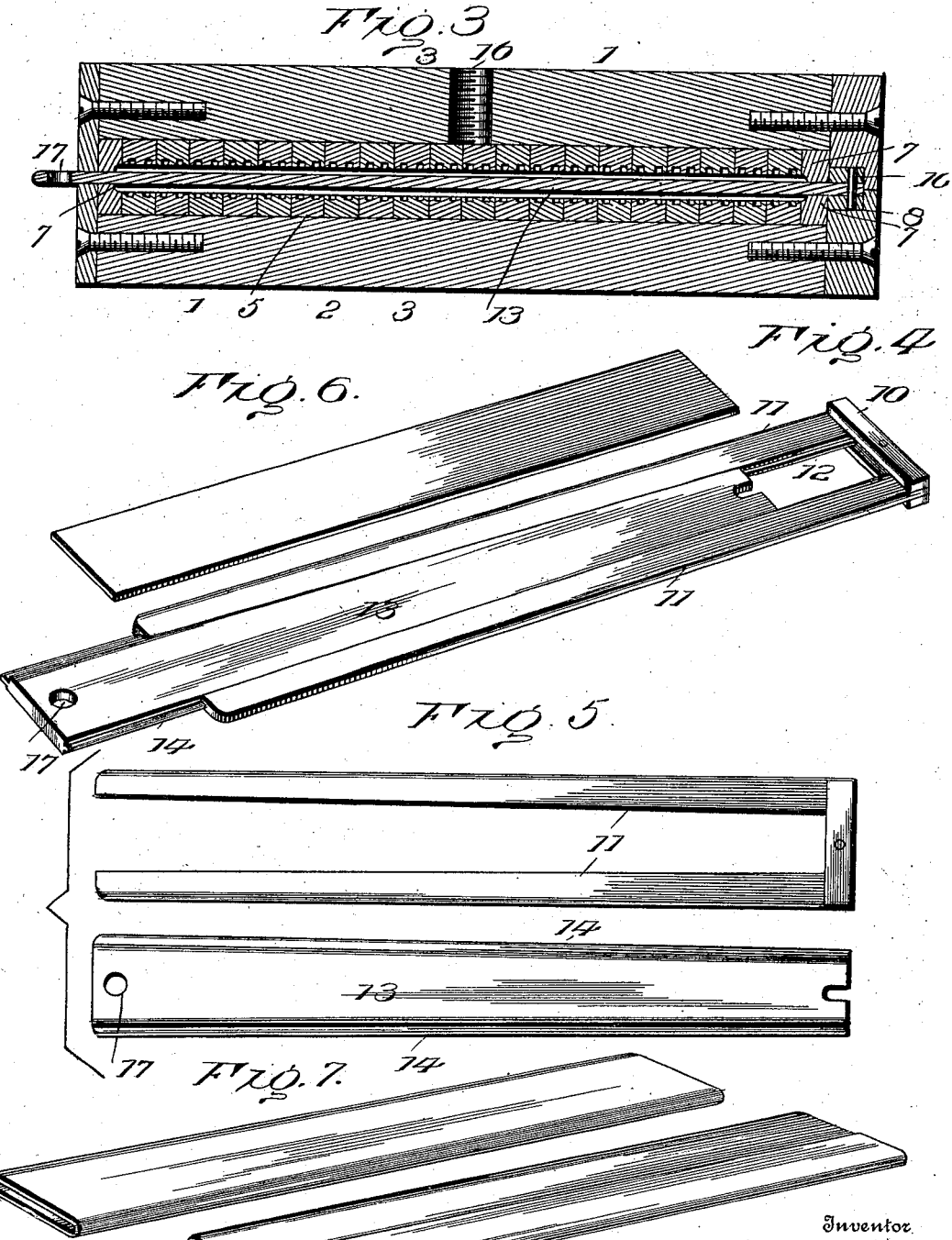

UNITED STATES PATENT OFFICE.

BENJAMIN B. HILL, OF PHILADELPHIA, PENNSYLVANIA.

METHOD OF FORMING ENDLESS BANDS.

SPECIFICATION forming part of Letters Patent No. 685,474, dated October 29, 1901.

Application filed May 1, 1901. Serial No. 58,341. (No model.)

*To all whom it may concern:*

Be it known that I, BENJAMIN B. HILL, a citizen of the United States, residing at Philadelphia, in the county of Philadelphia, State of Pennsylvania, have invented a certain new and useful Improvement in Methods of Forming Endless Bands, of which the following is a specification, reference being had to the accompanying drawings.

This invention relates to a method of forming and molding endless rubber bands especially adapted for use in dating and numbering stamps, where it is necessary to have endless bands of unvarying size or diameter with raised printing characters on their surfaces. The bands as heretofore manufactured have been defective in varying slightly in size, which is objectionable for obvious reasons. To overcome this defect is the object of the present invention, which is accomplished by using an endless tube of fabric as the base for the rubber covering, which is vulcanized thereon. In practice this endless fabric tube may be stretched before and during vulcanization; but if the tube is made with care, so that it is of the exact size desired for use, the stretching is not absolutely necessary.

With the object in view of forming bands of uniform size my invention consists in the novel method of forming endless bands hereinafter more particularly described and then definitely claimed at the end hereof.

In the accompanying drawings, illustrating apparatus suitable for carrying out my method, Figure 1 is a perspective view of the different parts of the apparatus used in my process, which shows the two sections of the mold slightly separated in order to illustrate how they are to be fitted together. Fig. 2 is a vertical cross-section of the same with a "band" therein. Fig. 3 is a longitudinal section. Fig. 4 is a perspective view of the adjustable or expansible "former." Fig. 5 is a top plan of the parts of the former separated. Figs. 6, 7, and 8 are details of the parts forming the band.

Referring now to the details of the drawings by numerals, 1 and 2 represent the two halves of the mold, the lower half 2 having lugs or pins $2^a$ projecting therefrom and entering the coinciding openings $1^a$ in the upper half 1. The said halves 1 and 2 are each formed of a base 3, to which are secured by screws or analogous means the side plates 4, and in the wide opening left between these side plates are situated the molds 5, which are made up of a number of plates held in position by overlapping flanges $4^a$ (see Fig. 2) projecting from the side plates 4. It will be noticed that this construction of side plates 4 and the molding-plates held between them forms a long channel or groove in which the bands are formed, the plates 5 forming the molds and also forming the bottom of this channel or groove. In these plates are formed the characters to be reproduced on the printing-bands, in the present instance the characters being numbers which run from "1" to "5," inclusive, on the upper half 1 and from "6" to "0" in the lower half 2, though of course my invention is adapted to other numbers or letters, the ones shown being those formed on bands used for printing numbers in dating-stamps.

Running lengthwise of each mold and on each side of the wide grooves or channels are narrow supplemental grooves 6, the purpose of which will be hereinafter explained.

At each end of each half of the mold is a slightly-raised portion 7, (see Fig. 3,) which raised portions are of the proper height to hold the former (to be described) the proper distance above the characters to afford a space for containing the fabric and rubber during the vulcanizing process.

At the opposite end of each part of the mold is a transverse groove 8, the lower mold 1 having two upwardly-projecting lugs 9 in its groove 8 and similar lugs $9^a$ at the opposite end, which form a means of holding the head of the former in position, as will appear later.

My adjustable former is illustrated in perspective detail, Fig. 4, and consists of a head 10, having projecting therefrom the two arms 11, which are grooved, as seen at 12, and a sliding member 13, which is formed with tongues 14, adapted to closely fit the aforesaid grooves and allow the member to slide therein. It will be observed that this sliding member is in reality a wedge—that is, it is made narrower at one end than at the other— so that when it is inserted in position between the arms 11 it will wedge or force them slightly apart, and I shall therefore hereinafter call this sliding member a "wedge." The head 10 of this former is properly proportioned to fit within the transverse grooves 8 hereinbefore described.

One section of the mold is preferably provided with grooves 15, and the other section with a screw-threaded opening or openings 16, by which the sections of the mold may be properly handled with tools while hot. The wedge of the former is also provided with a perforation 17, with which a properly-shaped tool may be engaged to withdraw the wedge from the former when the parts are too hot to be comfortably handled without tools.

In carrying out my process I may use as a base for the band a seamless fabric tube, as shown in Fig. 7, or an endless tube, which is formed by cementing its edges, as shown in Fig. 8. For obvious reasons, however, the seamless tube is much preferable.

The operation is as follows: A sheet of unvulcanized rubber cut to the proper size (see Fig. 6) is placed in the lower section 2 of the mold. An endless tube is then placed over the adjustable or expansible former, the wedge having been first withdrawn. This tube is of such a size as to be slipped on the former when the latter is not expanded, and when the wedge is inserted in the former the arms 11 are expanded laterally, thus stretching the tube to the desired extent. The expanded former, with its fabric covering, is now placed on the lower section of the mold on top of the sheet of unvulcanized rubber, which has already been placed in position. A similar sheet of rubber is then placed on top of the expanded former, when the top section 1 of the mold can be placed or fitted in position, the expanded former, with its fabric covering and the sheets of rubber on each side, being held within the wide grooves or channels between the two parts of the mold. The mold, with its contained material, is then introduced in the vulcanizing-press (which is unnecessary to here illustrate) and subjected to the usual vulcanizing process, and after vulcanization it will be found that the endless fabric and the two sheets of rubber now form one integral endless band. To withdraw the former from the completed article, it is first necessary to withdraw the wedge, and then the article can be slipped off of the arms of the former. When the article is withdrawn, there may be a slight ridge formed on each edge where the molds come together, and it is sometimes necessary to trim this off, although as this ridge is only hair-like in structure it can be left on, if desired. If the sheets should be a little too wide before vulcanizing, the surplus is squeezed into the grooves 6, although by taking great care in placing the sheets in position and in having them of the exact shape needed the grooves could be dispensed with. After the band has been removed from the mold it is cut into separate bands in any desirable way; but as this method of cutting is common and well known it is unnecessary to illustrate it here.

From the foregoing and accompanying drawings it will be seen that I have invented a process for making endless rubber bands which are specially suited for use in handstamps, and the process will be an important advance in the art, for the reason that the bands produced thereby are of unvarying size. It is obvious that when the fabric is made with great care, so as to have it of the exact size intended for use, it is not absolutely necessary to stretch it before it is placed in the mold; but when it is stretched the result is a band that cannot stretch in its future work.

It is also manifest that any preferable or desirable style or shape of former may be used without departing from the spirit of my invention, and while I prefer to use an expansible former, so as to stretch the bands and hold them during vulcanization, I do not limit my claims to a process in which an expansible former is used, as any desired means may be used to hold the fabric tube in its proper position within the mold. Likewise it will be found possible to use a single sheet of rubber wrapped around the fabric after the latter is placed on its former.

What I claim as new is—

1. The method of forming endless bands with printing characters thereon which consists in slipping or placing a fabric tube on a support, placing a sheet of rubber on the exterior side of said fabric tube, and vulcanizing the whole into a single endless band with printing characters thereon, substantially as described.

2. The method of forming endless bands with printing characters thereon which consists in slipping or placing a fabric tube over a support, stretching the fabric tube, applying a rubber coating or facing thereon and vulcanizing said coating with the characters thereon while the fabric is stretched, substantially as described.

3. The method of forming endless bands with printing characters thereon which consists in slipping or placing a fabric tube over a support, applying a coating or facing of rubber to the exterior of said fabric, vulcanizing said coating into an endless band with the printing characters thereon, and cutting the vulcanized article into endless printing-bands, substantially as described.

4. As a new article of manufacture, an endless printing-band comprising an endless fabric base and a facing or coating of rubber vulcanized on said endless fabric base, the meeting edges or ends of said rubber coating or facing being united by vulcanization and having no fabric between them where they are united or secured together, whereby the outer surface of the said rubber facing or coating is of uninterrupted continuity, substantially as described.

5. As a new article of manufacture, an endless printing-band comprising an endless, seamless base of fabric with a facing of rubber vulcanized thereon, substantially as described.

In testimony whereof I affix my signature, in the presence of two witnesses, this 18th day of April, 1901.

BENJAMIN B. HILL.

Witnesses:
JOHN M. SNYDER,
HARRY G. SPAETH.